Hatten & Angleberger,
Soldering Clamp.
Nº 61,191.      Patented Jan. 15, 1867.
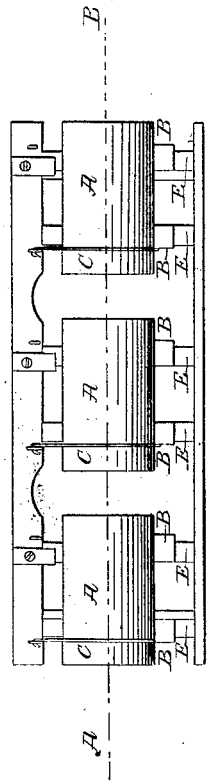
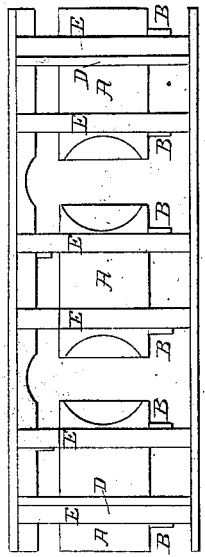
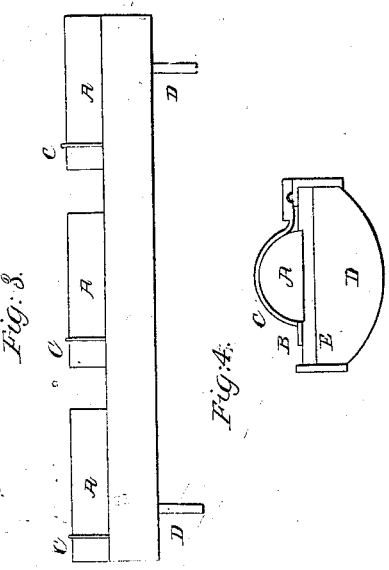
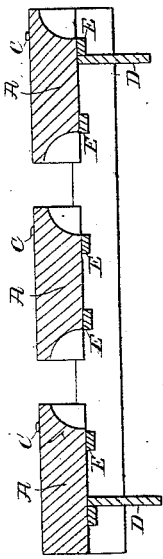
Witnesses:
D. K. Hubband.
E. G. Taylor.
Inventors.
H. C. Hatten.
J. P. Angleberger.

United States Patent Office.

HENRY C. HATTEN AND JOHN P. ANGLEBERGER, OF NEW CARLISLE, OHIO.

Letters Patent No. 61,191, dated January 15, 1867.

IMPROVED MACHINE FOR SOLDERING EAVES-TROUGHS.

The Schedule referred to in these Letters Patent and making part of the same.

TO ALL WHOM IT MAY CONCERN:

Be it known that we, HENRY C. HATTEN and JOHN P. ANGLEBERGER, of New Carlisle, in the county of Clark, and State of Ohio, have invented an Instrument or Machine to Aid the Soldering of Tin Eaves-Troughs. We hereby declare that the following is a full, clear, and exact description thereof, reference being had to the accompanying drawing, making a part of this specification, in which—

Figure 1 represents a top view.
Figure 2, a bottom view.
Figure 3, a side elevation.
Figure 4, an end view.
Figure 5, a section on line A B, in fig. 1.

The same letters of reference denote identical parts.

Our invention consists in convex blocks, A, made of wood, so as to fit the required kind or size of trough, these blocks being fastened to a frame (also made of wood) with spaces between the blocks to permit the soldering of the joints of the trough on the inner or concave side of the same, the blocks being made fast to the frame by screwing them to the cross-beams. The trough is fastened by buttons, B, and also by means of iron fastenings, C, made fast on one side of the trough, passing over the trough, and made fast temporarily on the other side of the same. The frame may be made any length, with as many blocks as convenience or necessity may require. The trough being laid on the convex side of the blocks, and fastened by means of the buttons and iron fastenings aforesaid, the convex side of the trough is first soldered, the frame is then turned over and the concave side and the stays are soldered, thus insuring a straight as well as a perfectly soldered eaves-trough.

What we claim as our invention, and desire to secure by Letters Patent, is—

A reversible frame for soldering eaves-troughs, constructed and arranged for use substantially as set forth.

HENRY C. HATTEN,
JOHN P. ANGLEBERGER.

Witnesses:
M. CORWIN TAYLOR,
D. K. HUBBARD.